2,913,374

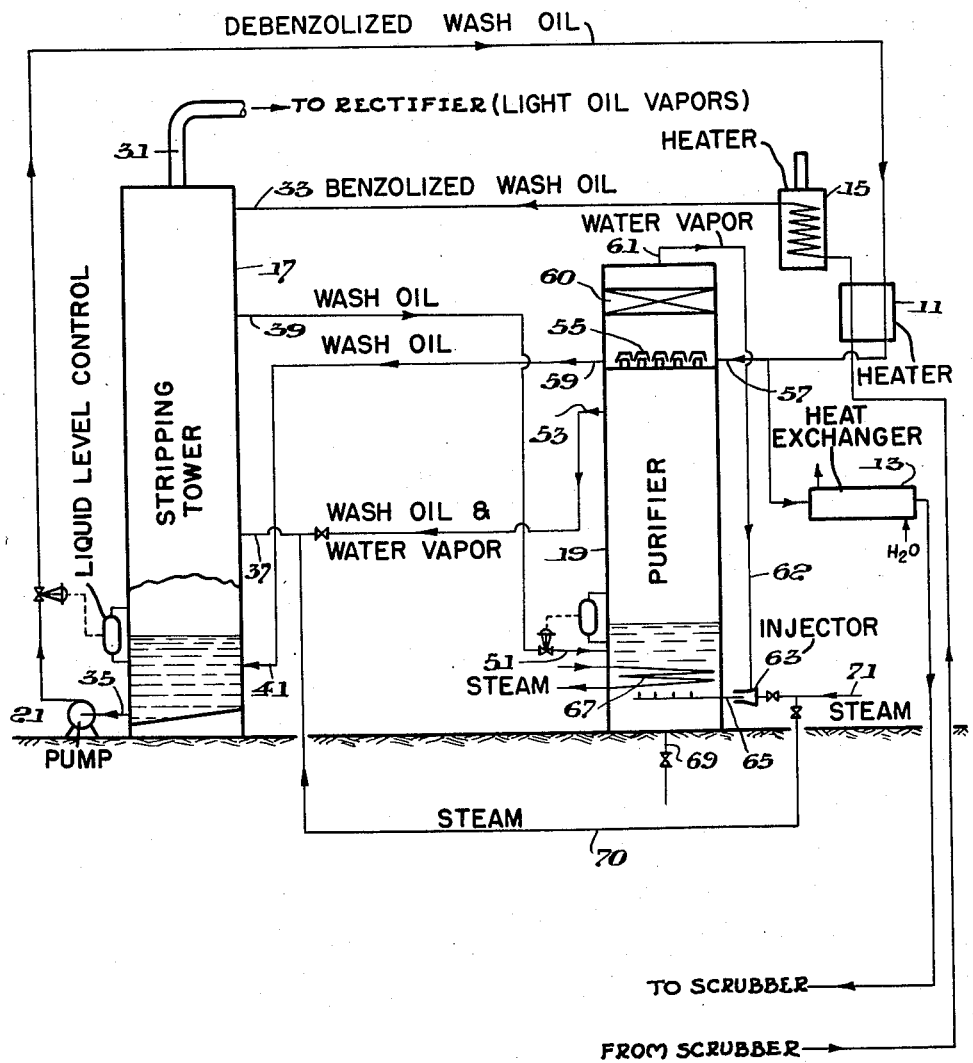

DEBENZOLIZING AND PURIFYING WASH OIL WITH STEAM

Joseph van Ackeren and Edward J. Helm, Pittsburgh, Pa., assignors to Koppers Company, Inc., a corporation of Delaware Application January 31, 1957, Serial No. 637,514

10 Claims. (Cl. 196—100)

This invention relates generally to the separation of an absorbed liquid component from an absorption liquid and more particularly to the removal of light oil from a benzolized wash oil taken from a scrubber for coke oven gas and the purification or regeneration of the wash oil so that the wash oil may be returned to the scrubber and as such is an improvement over copending application Serial No. 637,395.

Copending application Serial No. 637,395, filed concurrently herewith and assigned to the assignee of the present invention, discloses an apparatus wherein the vapors from a light oil stripping tower are conducted directly, and without an intermediate step of cooling the vapors to partially condense and remove the excess water vapor, to a rectifier where the vapors are distilled into desired fractions. The light oil is removed from the wash oil in the stripping tower by the use of water vapor that is supplied from a purifier for the wash oil, the wash oil being steam-distilled in the purifier and the vapors being sent to the stripping tower. A definite relationship exists between the quantity of water vapor required for the distillation of a given quantity of light oil from the wash oil at a given wash oil temperature, and this relationship is kept at a minimum to save steam costs and in order that the vapors from the stripping column may be fractionally distilled without the need of the intermediate step of partially condensing the vapors from the stripping tower to remove the excess water vapor. When the wash oil stripping operation is carried out at higher temperatures than normally used in the United States, for instance at 170 to 200° C. instead of the usual 120 to 130° C., the quantity of stripping steam, or water vapor, required is only about 20 to 30% of that required at conventional stripping temperatures. Such a reduced quantity of water vapor, however, is not sufficient to steam-distill enough wash oil in the wash oil purifier at temperatures that can be reached by indirectly heating the wash oil with steam at the pressures ordinarily found in most coke plants in the United States (100 to 200 p.s.i.g.) to maintain the desired degree of purity of the wash oil; and it was necessary in the copending application to provide additional heat for the oil in the purifier. While the afore-mentioned apparatus works well in practice, the provision of the additional heat for the distillation of the wash oil is not as efficient or desirable as the straight steam distillation of the wash oil.

An object of the present invention, therefore, is to provide a novel arrangement whereby the quantity of water vapor sent to the stripping tower is minimized to keep down the cost of stripping steam and so that the vapors from the stripping tower may be fractionally distilled without prior removal of the water vapor, and yet provide enough steam to distill a sufficient amount of wash oil to maintain a desired degree of purity of the wash oil being returned to the scrubber.

Another object of the invention is to provide a novel arrangement of a stripping tower and wash oil purifier wherein the water vapor for removing the light oil from the wash oil is provided by the steam distillation of the wash oil, a selected quantity of the steam distillation vapors being supplied directly to the stripping tower and the remaining quantity of the steam distillation vapors having the oil vapors separated from the water vapor by partial condensation of the oil vapor for return of the oil to the stripping tower while the water vapor which remains is recycled as steam for the steam distillation.

Another object of the invention is to provide a novel arrangement of a stripping tower and a wash oil purifier wherein a portion of the wash oil used may be purified by steam distillation and the resultant vapors divided into two portions, one portion being sent to the stripping tower for removing the light oil from the wash oil in the tower while the oil vapors of the remaining portion are removed by partial condensation and the water vapors remaining are recycled to the purifier for further steam distillation of the wash oil.

The present invention contemplates an arrangement wherein the benzolized wash oil obtained from a scrubber may have the light oil vapors removed for rectification of the light oil into fractional distillates without partial condensation of the vapors between the stripping tower and rectifier, while simultaneously having a portion of the wash oil purified to prevent a build-up of impurities during the recycling of the wash oil; this portion of the wash oil being steam-distilled to provide a mixture of oil and water vapors and a part of the oil and water vapors being sent to the stripping tower for supplying the water vapor required for the removal of the light oil, and the remaining part of the oil and water vapors having the oil separated therefrom by partial condensation for return to the tower as purified oil while the water vapor which is left is recycled for the steam distillation of the wash oil.

The above and further objects and novel features of the invention will appear more fully from the detailed description when the same is read in connection with the accompanying drawing. It is to be expressly understood, however, that the drawing is not intended as a definition of the invention but is for the purposes of illustration only.

The single sheet of drawing illustrates schematically an arrangement of the present invention for removing the light oil from the wash oil and purifying the wash oil.

Conventionally, the light oil is extracted from coke oven gas by contacting the gas in a scrubber with an absorbent or wash oil to absorb the light oil from the gas; and then the wash oil is stripped of its light oil in a stripping column; and the debenzolized wash oil is returned to the scrubber to absorb another quantity of light oil. Recirculating the wash oil in this manner tends to build up the amount of impurities therein unless provision is made for their removal. A common method for maintaining these impurities low is to purify a portion of the wash oil being returned to the scrubber; but, when the quantity of water vapor for the light oil removal is kept to a minimum, this quantity is not sufficient to purify the requisite amount of wash oil at the temperatures in the purifier attainable by heat exchange with steam at 100 to 200 p.s.i.g. as ordinarily found in coke plants, and provision is made in copending application Serial No. 637,395 for an additional heat supply to vaporize the oil so as to purify the desired amount of wash oil. While such an arrangement works well, the additional heat and resulting higher temperatures tend to increase the formation of sludge and polymer in the wash oil passed to the purifier and does not purify the oil as efficiently as steam distillation at the lower temperature.

Turning now to the drawing, the novel apparatus for removing the light oil from the benzolized wash oil which is taken from a scrubber and for purifying the wash oil for return to the scrubber comprises generally a heat exchanger 11 for cooling the light-oil-free-, or debenzolized, wash oil and for heating the benzolized wash oil, a heater 15 for further heating the benzolized wash oil, a stripping tower 17 in which the light oil is stripped from the wash oil with the aid of live steam, a purifier 19 for purifying a portion of the wash oil and for supplying the steam to the stripping tower, and a pump 21 for circulating the debenzolized wash oil. Neither the rectifier wherein the vapors from the stripping tower 17 are fractionated into desired distillates nor the absorber or scrubber wherein the light oil vapors are absorbed from the coke oven gas are shown because each may be of a conventional type and does not constitute a portion of the present invention.

Heat exchangers 11 and 13 may be of a conventional type, heat being transferred from the debenzolized wash oil to the benzolized wash oil in exchanger 11 and from the debenzolized wash oil to cooling water in exchanger 13.

Heater 15 may be a pipe still of a conventional type, or it may be a shell and tube heat exchanger of conventional type heated by high pressure steam, Dowtherm, or other conventional heating medium.

The stripping tower 17 may be of a conventional type having a vapor outlet 31, an inlet 33 for the benzolized wash oil, an outlet 35 for the debenzolized wash oil, and an inlet 37 for the water vapors for the stripping of light oil from the wash oil. In accordance with the present invention, the tower is also provided with a takeoff 39 for withdrawing a portion of the wash oil to be purified and an inlet 41 for purified wash oil. A steam by-pass 70 may be provided around the wash oil purifier to permit operation of the stripping tower if the purifier is taken off the line.

In accordance with the present invention, the steam for the stripping tower 17 is first sent through the novel purifier 19 which has an inlet 51 for receiving the wash oil to be purified, an outlet 53 for vapors, a bubble-type tray 55 for condensing the wash oil vapors, an inlet 57 for cool wash oil for the condensing of the wash oil vapors, an outlet 59 for the purified wash oil, a mist separator 60, a water vapor outlet 61 connected by way of conduit 62 and compressing injector 63 with a steam inlet 65, an auxiliary indirect steam heating coil 67, and an outlet 69 for the withdrawal of the residue.

The benzolized wash oil as taken from the scrubber at a temperature of about 30° C. flows through heat exchanger 11 where it is heated countercurrently to about 150° C. by the hot debenzolized wash oil which is cooled from a temperature of about 180° to 60° C. The preheated benzolized wash oil is then heated further in heater 15. The hot oil flows into inlet 33 at the upper portion of the stripping tower 17; and as the wash oil flows down the tower, the light oil is stripped out by means of the mixture of oil and water vapors introduced at inlet 37. The debenzolized wash oil is forced by pump 21 from outlet 35 into the heat exchanger 11, and light oil vapors at conduit 31 are conducted to a rectifier (not shown).

To provide the mixture of oil and water vapors, a portion of the oil flowing down tower 17 is withdrawn at takeoff 39 (it is obvious, however, that the oil may be withdrawn from other places, as from pump 21) and introduced into purifier 19 at inlet 51. The steam coils 67 and steam introduced at inlet 65 vaporize the bulk of this portion to provide a mixture of oil and water vapors, leaving as residue the polymerized non-volatile impurities in the wash oil. Part of this mixture is led from purifier 19 to inlet 37 to provide the water vapor necessary to strip the light oil from the wash oil. The rest of the mixture of vapors passes through bubble cap plate 55 where the wash oil vapors are substantially condensed by contact with the cooled wash oil fed from heat exchanger 11 to inlet 57. The purified wash oil is fed from outlet 59 to inlet 41 of the stripping tower. The water vapors, which were in the mixture and which remain as vapors, are conducted by conduit 62 back to inlet 65 at the bottom of the purifier after being suitably compressed by injector 63 so as to distill more of the wash oil. The quantity of stripping steam required for stripping the light oil from the wash oil in tower 17, is used as the compressing fluid in injector 63. The stripping steam is supplied at elevated pressure, preferably in the range of 100 to 200 p.s.i.g or more through conduit 71. The residue from purifier 19 is drawn off at outlet 69.

The foregoing has presented a novel method and apparatus for efficiently and economically removing the light oil from a wash oil which has been used for scrubbing coke oven gas and for purifying the wash oil for use again in the scrubber. The steam used for the stripping of the light oil from the wash oil is kept at a minimum to reduce cost and so that the resulting vapors may be rectified without intermediate cooling to remove the excess water vapors; yet, in accordance with the invention, the wash oil may be steam-distilled and a part of the steam recycled without passing the stripping tower. Recycling a portion of the steam in the wash oil purifier permits an increase in the quantity of wash oil purified without increasing the stripping steam. Advantage is taken of the pressure of the stripping steam for the motive force for recirculation of the steam.

Obviously many modifications and variations of the invention as hereinbefore set forth may be made without departing from the spirit and scope thereof.

What is claimed:

1. In an apparatus for removing the light oil from benzolized wash oil taken from a scrubber and for purifying the wash oil for return to the scrubber, comprising a tower for the application of water vapor to said benzolized wash oil to remove the light oil therefrom, a purifier adapted to receive a portion of the oil from said tower, means for introducing steam to said purifier to vaporize said oil whereby a mixture of oil and water vapors is produced, and means for conducting one part of said mixture to said tower to supply said water vapor thereto, the improvement comprising means for removing the purified oil vapor from the other part of said mixture of oil and water vapor as condensate and returning said condensate to said tower as purified oil, whereby the water vapor of said other part remains, and means for removing from said purifier said last-named water vapor and recirculating the latter to the lower portion of said purifier.

2. In an apparatus for removing the light oil from a benzolized wash oil obtained from a scrubber and for purifying the wash oil for return to the scrubber, comprising first means for applying water vapor to said benzolized oil to remove the benzol therefrom, second means for receiving a portion of the oil from said first-named means and including steam provision means to vaporize said oil thereby producing a mixture of oil and water vapors, and means for supplying one part of said mixture to said first-named means to provide the water vapor therefor, the improvement comprising means for removing the oil vapor from the other part of said mixture by condensation and returning the condensate to said first means as purified oil, and means for supplying the water vapor remaining from said other portion to the lower part of said second means.

3. In an apparatus for treating wash oil from a benzol scrubber to remove the light oil from the wash oil and purify the oil for return to the scrubber comprising stripping means for applying water vapor to said wash oil to remove the light oil therefrom, and purifying means for vaporizing a portion of said wash oil with steam to purify said oil and thereby produce a mixture of oil and water vapors, the improvement in said purifying means including means for supplying one part of the mixture to said stripping means to supply said water vapor thereto, means for condensing the oil vapors from the remaining part of said mixture without condensing the water vapor, means for returning the condensed oil to said stripping means as purified oil, and means for recycling said last-mentioned water vapor to said purifier means for vaporizing more of said wash oil.

4. In an apparatus for removing light oil from a benzolized wash oil while purifying the wash oil for re-use as debenzolized wash oil comprising a stripping tower including an inlet for said benzolized oil at the upper portion of said tower, an outlet for debenzolized oil at the lower portion of said tower, an outlet for light oil vapor at the upper portion of said tower, and a purifier including means for conducting a portion of the wash oil from said tower to said purifier, and means for introducing steam to said purifier to vaporize said wash oil thereby producing a mixture of water and oil vapors, the improvement comprising means for conducting one part of said mixture to said tower to supply water vapor to said tower for removing the light oil as said vapor from said wash oil, means for separating the oil from the other part of said mixture as condensate leaving the water as vapor, means for returning the condensate to a lower portion of said tower as purified wash oil, and means for conducting said last-mentioned water vapor to said steam introducing means.

5. In a combination of a stripping tower for removing the light oil from a benzolized wash oil and a purifier for purifying the wash oil for reuse, said purifier including means for receiving a portion of the wash oil from said tower, and means for introducing steam to said purifier, whereby said steam vaporizes the bulk of said oil so as to produce a mixture of oil and water vapors, the improvement comprising means for conducting one part of said mixture to said tower, whereby said part supplies the water vapor for removing the light oil from said wash oil in said tower, means in said purifier for condensing the oil vapor from the other part of said mixture whereby the water of the mixture remains as vapor and the oil becomes condensate, and means for returning the condensate to said tower as purified wash oil, and means for conducting said remaining water vapor from said purifier to said steam introducing means.

6. In an apparatus for removing the light oil from a benzolized wash oil and for purifying the oil for reuse comprising a tower for applying water vapor to the wash oil to remove the light oil therefrom as vapor, a purifier adapted to receive a portion of the oil from said tower, and means for introducing steam into said purifier to vaporize said oil thereby producing a mixture of oil and water vapors, the improvement comprising means for maintaining the water vapor applied to said tower at a minimum, whereby the steam costs are low and whereby condensation of water vapor from said light oil vapor is not required before subsequent processing of said vapor, including means for conducting one part of said mixture to said tower to supply the water vapor for said tower, means for removing the oil vapor from the other part of said mixture as condensate whereby the water vapor remains, means for returning said condensate to said tower as purified wash oil, and thermocompression means, means for conducting said remaining vapor to said thermocompression means so that said vapor is compressed, and means for supplying said compressed water vapor to said steam introducing means.

7. In an apparatus for removing the light oil from a benzolized wash oil and for purifying the wash oil for reuse, comprising a stripping tower for removing the light oil from the wash oil by the application of water vapor thereto, an elongated upright purifier adapted to receive a portion of the wash oil from said tower, and means at the lower section of said purifier for receiving steam to vaporize the bulk of said portion thereby producing a mixture of water and oil vapors, the improvement comprising first means at an intermediate section of said purifier for withdrawing one part of said mixture to supply said water vapor for said tower, second means at an upper section of said purifier for withdrawing any remaining vapor from said purifier, and means disposed between said first and second means for removing the oil vapors from the other part of said mixture as condensate and returning the condensate to said tower as purified wash oil whereby said remaining vapors at said second means are essentially water vapors, and means for conducting said last-mentioned water vapors to said steam receiving means.

8. In an apparatus for separating the light oil from benzolized wash oil comprising a stripping tower for receiving said benzolized wash oil, and a purifier for receiving a portion of the wash oil from said tower and having means for vaporizing the bulk of said portion with steam to produce a mixture of oil and water vapors, the improvement comprising means for supplying a part of said mixture to said tower to remove the light oil from said wash oil, means to separate the oil vapor from the water vapor of the remaining part of said mixture by condensation of said oil vapor, and means for recycling the water vapor left of said other part for said vaporization of said oil with steam.

9. In an apparatus for removing the light oil from a wash oil and purifying the wash oil for reuse comprising a tower adapted to receive said wash oil and water vapor for removing the light oil from said wash oil by said water vapor, and a purifier adapted to receive a portion of the wash oil from said tower and to receive steam for vaporizing the bulk of said wash oil to produce a mixture of oil and water vapors, the improvement comprising means for sending a part of said mixture to said tower to provide the water vapor for said tower, and means for removing the oil vapor from the other part of said mixture and returning the vapor that remains as said steam for said purifier.

10. In an apparatus for the removal of light oil from benzolized wash oil from a scrubber to obtain light oil as a product and debenzolized wash oil for return to said scrubber comprising a stripping tower having a vapor outlet and a benzolized wash oil inlet at its upper section and a debenzolized wash oil outlet at its lower section, a heat exchanger adapted to receive the benzolized wash oil from said scrubber and the debenzolized oil from said outlet for cooling said debenzolized wash oil and partially heating said benzolized wash oil by heat transfer from the former to the latter, means for conducting said partially heated benzolized oil to said inlet and including means for further heating said benzolized oil, said oil being subjected to water vapor as it flows through said tower from said inlet to said outlet so that light oil and water vapors are produced at said vapor outlet, an upright vessel constituting a wash oil purifier, first means connecting said tower and a lower section of said purifier to conduct a portion of said wash oil to said purifier, and a steam inlet at the lower portion of said purifier whereby the bulk of said wash oil is vaporized by steam to produce a mixture of oil and water vapors, the improvement comprising second means connecting said purifier and said tower to supply one portion of said mixture to said tower to provide said water vapor to said tower, a bubble cap plate positioned in said purifier above said second means and connected to said heat exchanger for conducting a portion of said cooled debenzolized wash oil to said plate so that the oil vapors of the remaining portion of said mixture are removed as condensate and for conducting the condensate to said tower as purified wash oil, and means for coonducting the water vapors left of said remaining portion to said steam inlet, said steam inlet including a steam injector for compressing said water vapor.

References Cited in the file of this patent

UNITED STATES PATENTS

| | | |
|---|---|---|
| 2,196,878 | Stover | Apr. 9, 1940 |
| 2,335,162 | Shiras | Nov. 23, 1943 |
| 2,472,810 | Denig | June 14, 1949 |